United States Patent [19]

Sticht

[11] Patent Number: 4,938,095
[45] Date of Patent: Jul. 3, 1990

[54] SAFETY MODULE FOR MACHINE TABLE IN AN ASSEMBLY LINE

[76] Inventor: Walter Sticht, Karl-Heinrich-Waggerl-Strasse 8, A-4800 Attnang-Puchheim, Austria

[21] Appl. No.: 190,002

[22] Filed: May 4, 1988

Related U.S. Application Data

[60] Division of Ser. No. 119,244, Nov. 5, 1987, Pat. No. 4,762,218, which is a continuation of Ser. No. 912,170, Sep. 26, 1986, abandoned, which is a continuation of Ser. No. 695,840, Jan. 28, 1985, abandoned.

[30] Foreign Application Priority Data

| Feb. 6, 1984 | [AT] | Austria | 365/84 |
| Jan. 28, 1985 | [IN] | India | 54/85 |
| Jan. 29, 1985 | [CA] | Canada | 473068 |
| Jan. 29, 1985 | [DE] | Fed. Rep. of Germany | 8502222[U] |
| Jan. 29, 1985 | [DE] | Fed. Rep. of Germany | 3502820 |
| Jan. 30, 1985 | [AU] | Australia | 38233/85 |
| Jan. 31, 1985 | [CH] | Switzerland | 442/85 |
| Feb. 3, 1985 | [IL] | Israel | 74230 |
| Feb. 5, 1985 | [CS] | Czechoslovakia | 786-85 |
| Feb. 5, 1985 | [FR] | France | 85 01582 |
| Feb. 5, 1985 | [HU] | Hungary | 434/85 |
| Feb. 5, 1985 | [NO] | Norway | 850424 |
| Feb. 5, 1985 | [ES] | Spain | 540134 |
| Feb. 5, 1985 | [SU] | U.S.S.R. | 3850150 |
| Feb. 5, 1985 | [YU] | Yugoslavia | 167/85 |
| Feb. 6, 1985 | [AR] | Argentina | 299446 |
| Feb. 6, 1985 | [BR] | Brazil | 8500539 |
| Feb. 6, 1985 | [KR] | Rep. of Korea | 750/1985 |
| Feb. 6, 1985 | [GB] | United Kingdom | 8503049 |
| Feb. 6, 1985 | [GB] | United Kingdom | 2153767 |
| May 12, 1986 | [TW] | Taiwan | 75204237 |

[51] Int. Cl.$^5$ .............................................. F16P 1/00
[52] U.S. Cl. ........................................ 74/608; 74/612
[58] Field of Search ................ 74/608, 609, 612, 613, 74/614, 615, 616; 192/133 X, 134; 49/445 X, 450, 121, 464; 53/77, 460; 198/345, 465.2, 465.1, 348

[56] References Cited

U.S. PATENT DOCUMENTS

| 1,998,245 | 4/1935 | Laukhuff | 74/613 X |
| 2,903,120 | 9/1959 | Thomas | 198/465.2 X |
| 3,132,930 | 5/1964 | Abbott et al. | 104/35 |
| 3,478,859 | 11/1969 | Krempel et al. | 198/465.2 X |
| 3,798,998 | 3/1974 | Connors et al. | 74/612 |
| 3,848,721 | 11/1974 | Smit | 192/133 |
| 3,854,883 | 12/1974 | Lemelson | 198/348 X |
| 3,988,980 | 11/1976 | Walker | 74/612 |
| 4,014,428 | 3/1977 | Ossbahr | 198/345 |
| 4,129,048 | 12/1978 | Shocklee et al. | 74/612 |
| 4,147,250 | 4/1979 | Schulz | 198/465.2 |
| 4,179,987 | 12/1979 | Dohm | 192/133 X |
| 4,209,898 | 7/1980 | Aoki et al. | 198/345 X |
| 4,220,032 | 9/1980 | Smith | 74/615 X |
| 4,239,445 | 12/1980 | Ozawa | 198/345 X |
| 4,363,267 | 12/1982 | Greer | 49/445 X |
| 4,369,872 | 1/1983 | Sticht | 198/345 |
| 4,398,435 | 8/1983 | Vansice et al. | 74/612 |
| 4,422,264 | 12/1983 | Harris | 49/445 X |
| 4,492,297 | 1/1985 | Sticht | 198/345 |
| 4,498,567 | 2/1985 | Aultz et al. | 74/612 X |
| 4,513,854 | 4/1985 | Prodel et al. | 198/465.1 |
| 4,515,264 | 5/1985 | Sticht | 198/465.2 |
| 4,687,091 | 8/1987 | Sticht | 198/345 |
| 4,762,218 | 8/1988 | Sticht | 198/345 |

FOREIGN PATENT DOCUMENTS

| 3112911 | 10/1982 | Fed. Rep. of Germany | 198/465.1 |
| 1408002 | 10/1975 | United Kingdom | 192/133 |
| 1559735 | 1/1980 | United Kingdom | 74/609 |
| 2040244 | 8/1980 | United Kingdom | 198/465.2 |
| 2104174 | 3/1983 | United Kingdom | 74/608 |

Primary Examiner—Vinh T. Luong
Attorney, Agent, or Firm—Kurt Kelman

[57] ABSTRACT

A safety module for a machine table comprises two vertical columns, a safety plate supported by the vertical columns for protecting the machine table and designed to aid in the prevention of accidents, cantilevers connecting the columns to flanges at a front of the machine table, and releasable coupling devices received in bores in the flanges for connecting the cantilevers thereto.

3 Claims, 4 Drawing Sheets

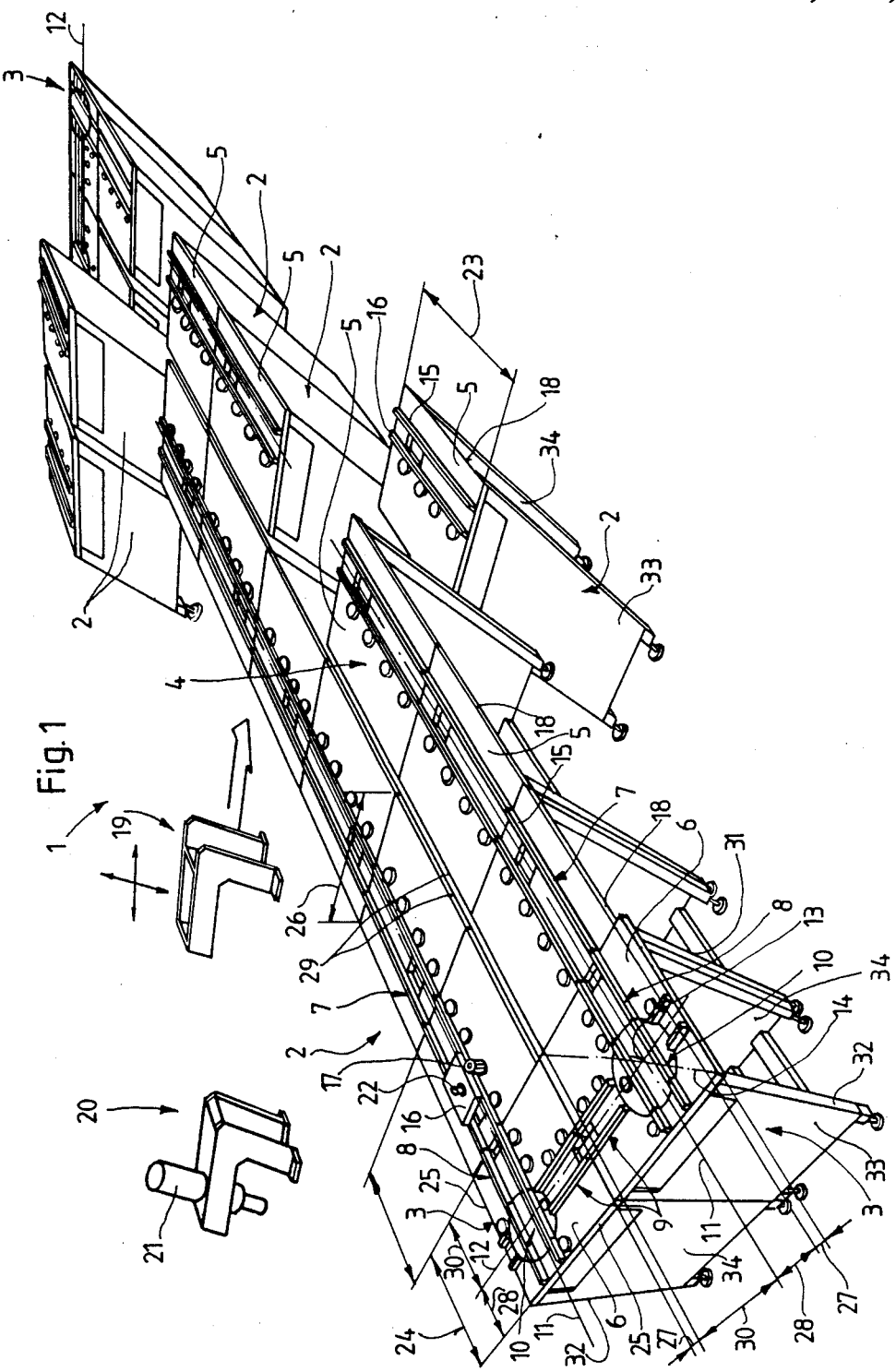

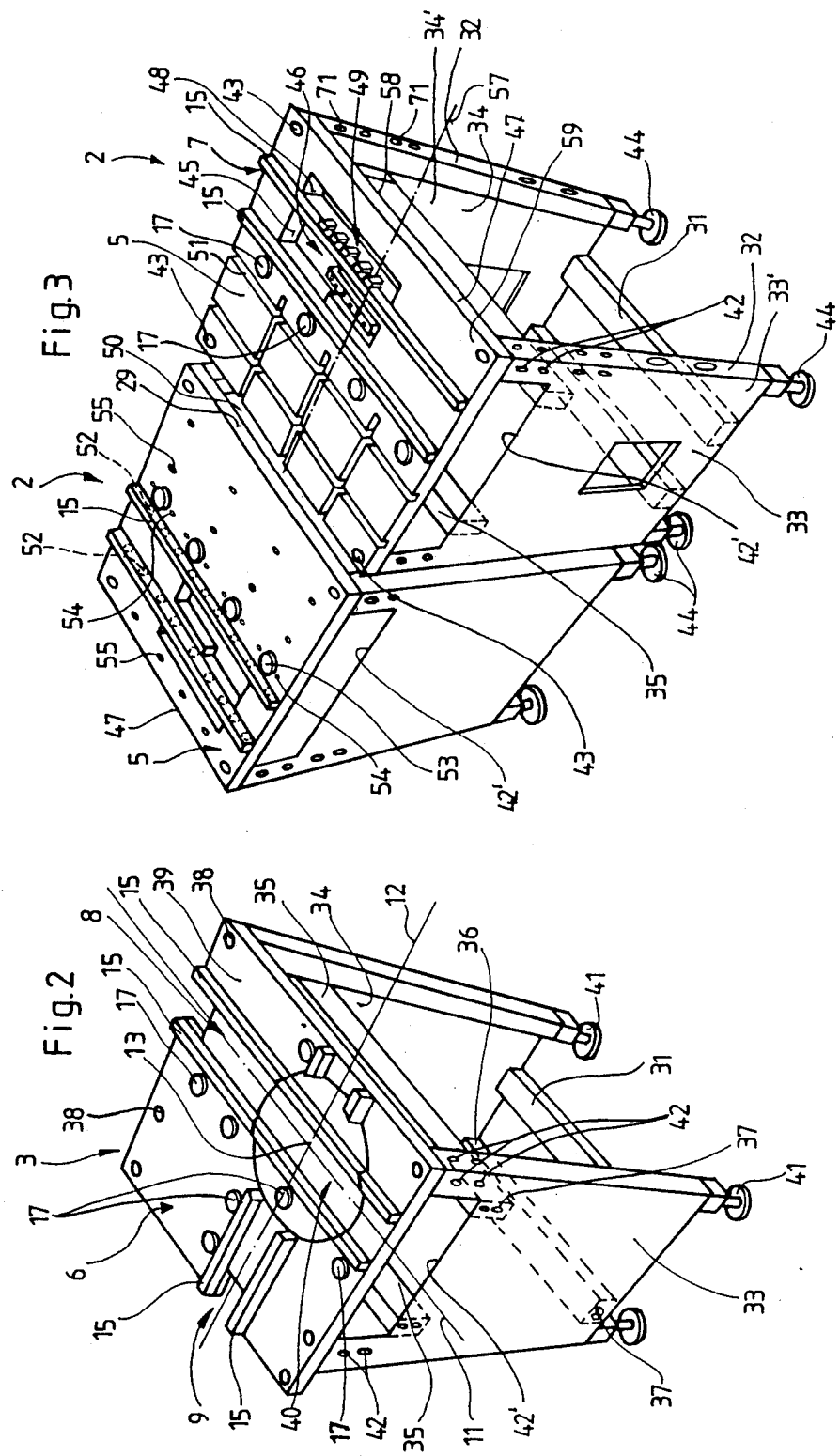

SAFETY MODULE FOR MACHINE TABLE IN AN ASSEMBLY LINE

CROSS-REFERENCE TO RELATED APPLICATION

This is a division of my copending U.S. Pat. application Ser. No. 119,244, filed Nov. 5, 1987, now U.S. Pat. No. 4,762,218 issued on Aug. 9, 1988 which is a continuation of abandoned application Ser. No. 912,170, filed Sept. 26, 1986, which is a continuation of abandoned application Ser. No. 695,840, filed Jan. 28, 1985.

BACKGROUND OF THE INVENTION

1. Field of the Invention

The present invention relates to an accident prevention or safety module for a machine table at an assembly station of a production plant having several such stations.

2. Description of the Prior Art

U.S. Pat. No. 4,492,297 discloses a production plant comprising an assembly line of several separate stations equipped with machine tables accommodating guiding devices or devices for positioning, arresting and conveying workpiece carriers for machining or assembling of workpieces situated thereon.

SUMMARY OF THE INVENTION

It is a primary object of this invention to provide the machine tables of such a production plant with accident prevention or safety modules which may be readily coupled to the machine tables.

The machine table has two vertically extending support elements and a table plate supported on, and connected to, the support elements, each support element having flanges defining bores. The safety module of the invention comprises two vertical columns and safety plate means supported by the vertical columns for protecting the machine table and designed to aid in the prevention of accidents, cantilevers connecting the columns to the flanges at the front of the machine table, and releasable coupling devices received in the bores for connecting the cantilevers thereto. Such a safety module has been disclosed in my copending U.S. Pat. No. 4,681,043, dated July 21, 1987 and having the same effective date as the present application, and has been claimed therein in combination with a specific type of modular machine table.

BRIEF DESCRIPTION OF THE DRAWING

The invention will now be described by way of example with reference to the accompanying partly diagrammatic drawings, in which:

FIG. 1 shows a production plant in accordance with the invention in a simplified diagrammatical and graphic form;

FIG. 2 is a perspective view from above of a deflector module of the production plant of FIG. 1;

FIG. 3 is a perspective view from above of two conveying modules of the production plant of FIG. 1, allocated to respective ones of two adjacent contra-directional guiding devices of the production plant;

DETAILED DESCRIPTION OF THE PREFERRED EMBODIMENTS

Figure 5:
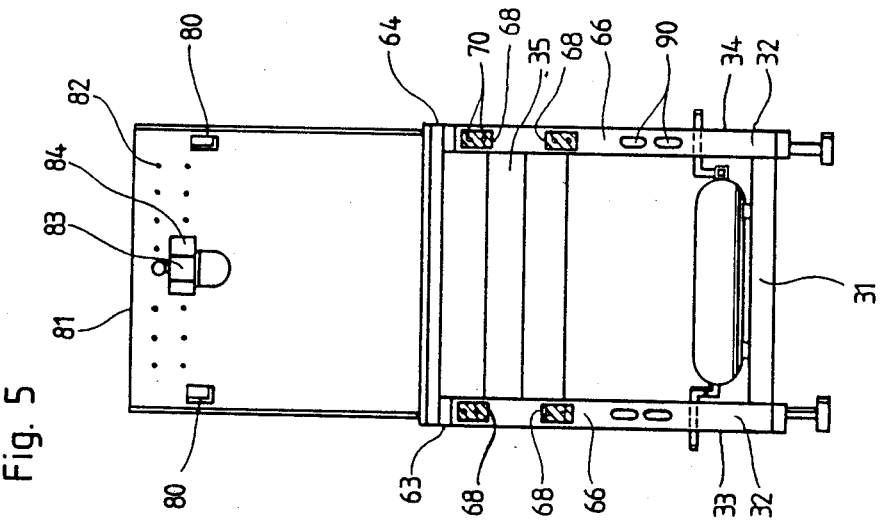
FIG. 5 is an end view of the conveying module of FIG. 4 partially in cross-section along the lines V—V.

Referring now to FIG. 1, a production plant 1 comprises several modularly assembled individual stations, the complete production plant comprising two different kinds of individual stations, namely conveying modules 2 and deflector modules 3. A manual working module 4 corresponding substantially in its form to a conveying module 2 is provided, the module 4 incorporating two table plate modules 5 positioned one right behind the other in longitudinal direction and identical to table plate modules 5 of the conveying modules 2.

Guiding track modules 7, 8, 9 are situated on the upper sides of the table plate modules 5 of the conveying modules 2 and of the table plate modules 6 of the deflector modules 3, the guiding track modules 7 of the front and rear rows of the consecutively positioned conveying modules 2 and guding track modules 8 and 9 of deflector modules 3 forming two continuous conveyor tracks extending parallel to each other, guding track modules 9 forming two transverse conveyor tracks extending transversely of the longitudinal conveyor tracks at the opposite ends of the production plant 1. The connection between the longitudinal and the transverse conveyor tracks is established at the deflector modules 3 by means of rotary plate or turntable modules 10. The central longitudinal axes 11 of the longitudinal conveyor tracks and the central longitudinal axes 12 of the transverse conveyor tracks intersect each other at the centers of the turntable modules 10, point of intersection 13 of these central longitudinal axes 11, 12 lying on a diagonal 14 of the table plate module 6 of the deflector module 3. Workpiece carriers 16 of which, for the sake of clarity, one only is illustrated in FIG. 1 are guided vertically and laterally on guiding bars 15 of the guiding track modules 7 to 9. The advance of the workpiece carriers 16 along the conveyor tracks formed by the guiding bars 15 is performed by means of feed modules 17, which may, for example, have rotary friction drives. Feed modules of the nature described in U.S. Pat. No. 4,492,297 are preferred.

As shown diagrammatically, handling modules 19 or processing modules 20, provided for example with screwing mechanisms 21, may be situated beside guiding track modules 7 close to the front end endges 18 of the table plate modules.

As indicated by the laterally offset and lowered or raised conveying modules 2 in FIG. 1, modules may readily be removed from the production plant or subsequently incorporated therein at any time. In this connection, the downwardly lowered conveying module 2 could, for example, be replaced by a deflector module 3 so that workpiece carriers bearing erroneoulsy assembled workpieces 22 could be gated out of the circulatory guiding track.

The production plant 1 may be adapted at any time to a varying production requirement, and may, for example, initially be equipped with several manual working modules 4 and but few conveying modules 2 upon starting production of a new product in commensurately small numbers of units. In this initial stage of production, essentially only technical operations such as screw cutting, rivetting, pressing, welding and the like are performed in the work areas of the conveying modules 2, whereas the feed and fit movements are performed by hand at the manual modules 4. As production figures are increased, the manual working stations are multiplied and different complex individual components required in greater numbers are then supplied, separated and made ready for manual assembling, in a fully automatic manner. Once the production has then reached the development stage in which production in large series is required, some or all of the manual working modules may be replaced in accordance with the output performance required by conveying modules comprising fit and feed mechanisms operated in a fully automatic manner.

A further advantage of the production plant according to the invention consists in that, as production figures are reduced, the plant may be cut back in proportion to the diminishing production figure thanks to the utilization of a plurality of identical parts and to the easy interchangeability of the parts, and may be reorganized for manual working or shut down and disassembled upon completion of the production run of this product, while retaining a high degree of reusability of the individual modules in a production plant for other products. This production plant thereby meets present-day desiderata for flexible automation of assembling operations and creates the opportunity of allowing the degree of automation of the production or assembling operation to rise in proportion to the production figure to be reached. Furthermore, the cost of investment is reduced thanks to the high degree of reusability of the modules, and the advantages of automation for producing products of higher quality may be fully exploited at low production level.

Figure 4:
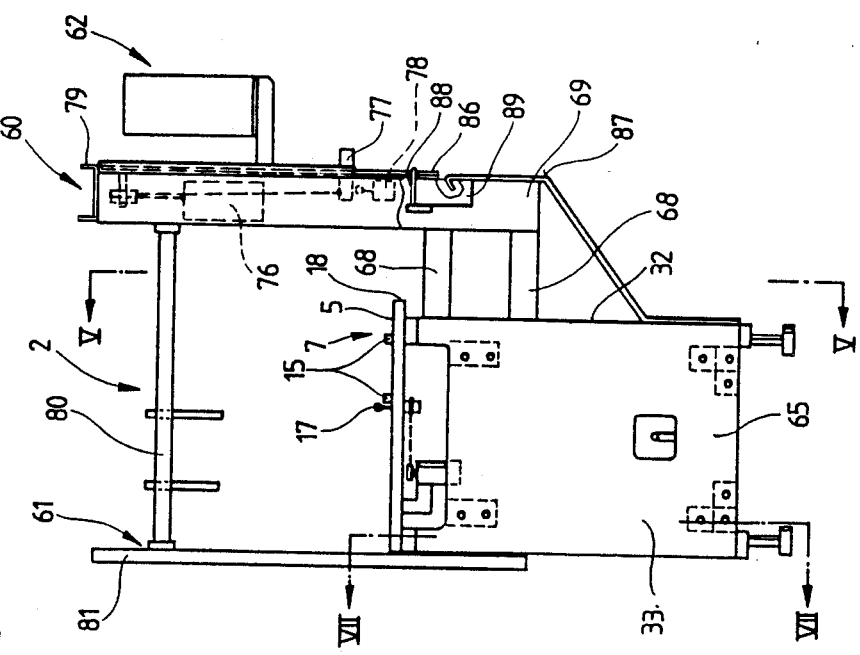
FIG. 4 is a side elevation of a conveying module of the production plant of FIG. 1 with attached safety and monitoring or verification modules.

The dimensions of the table plate modules 5 and 6 for the conveying and deflector modules 2 and 3 are important regarding the possibility of making do with two fundamental types of individual stations, namely the conveying module 2 and the deflector module 3, for a complete production plant. Length 23 of edge 18 of conveying module 2 is thus equal to length 24 of edge 25 of the square table plate module 6 of the deflector module 3. Width 26 of conveying module 2 is smaller by twice the dimension 27 than the length 24 or 23. Also, as is apparent from FIG. 1, the central longitudinal axes 11, 12 of the guiding tracks are asymmetrically positioned with respect to the lateral edges of the table plate modules 5, 6. To this end, the central longitudinal axes 11, 12 are situated at a distance 28 from the closer edges 18, 25, and at a distance 30 from the more distant edges 29. Because the square table plate modules 6 are enlarged in each case by dimension 27 with respect to the central longitudinal axes 11 and 12, respectively, of the guiding tracks, relative to the width 26 of the conveying modules 2, these may be joined to the conveying modules 2 in an optional orientation and a direct connection or continuous guiding track may then be established in each case between two directly adjacent deflector modules 3. The gap formed by virtue of the doubled dimension 27 between the mutually facing edges 29 of the conveying modules 2 may be utilized for access to install plates for plant modules or to lead through conductors. Suitably identical subframes are used for the conveying and deflector modules 2 and 3, for example, as shown, comprising transverse struts 31, 35, 36 connecting identical plate-like side components 33, 34 equipped with flanges 32, and in the case of the deflector modules 3 the distal edges 25 terminate flush with the flanges 32 of the side components 33, 34 so that the distance between the distal flanges 32 of two adjacently arranged deflector modules 3 corresponds to twice the length 23 of a conveying module 2. The same accident prevention or safety modules shown in FIG. 4 and described below as for the manual working modules 4 and conveying module 2 may thus be utilized for the transversely extending guiding tracks 9 at the terminal extremities of a production plant. The utilization of the table plate modules for manual working stations too is rendered possible by placing the central longitudinal axes 11, 12 of the guiding tracks close to the front edges 18 of the table plate modules 5, 6 since the guiding track modules and thus the workpiece carriers 16 may be guided past the operator at an ergonomically correct distance.

A deflector module 3 is shown in FIG. 2. This comprises plate-like side components 33, 34 forming two support elements which are interconnected via transverse struts 35, 36 extending horizontally at right angles thereto. Connection means 37, e.g. screws, are provided to join the components 33, 34 to the transverse struts 35, 36. The side components 33, 34 have a channel-shaped cross section. The upper ends of the components 33, 34 are releasably joined to the table plate module 6 via connecting means 38. Hexagon recessed head screws arranged in a recessed manner are utilized preponderantly as connecting means.

Two guiding track modules 8, 9 for workpiece carriers 16 are arranged on the upper side of a table plate 39. Central longitudinal axes 11, 12 of the guiding track modules 8, 9 have their point of intersection 13 on a diagonal of the table plate 39. The two guiding track modules are eccentrically positioned on the table plate 39 and comprise two guiding bars 15 symmetrically arranged with respect to the central longitudinal axes 11, 12.

A rotary plate or turntable 40 carries guiding bar segments symmetrically arranged with respect to point of intersection 13 and is rotatable thereabout. Feed modules 17 formed by friction roller drives are situated laterally with respect to the guiding track modules 8, 9.

The side components 33, 34 are each provided with a pair of lower adjustable supports 41 and bores 42 are incorporated in flange portion 32 and web portions 33' and 34' of the components 33, 34 for connecting adjacently situated modules 2, 3.

Conveying modules are shown in FIG. 3, and the table plate modules 5 are in each case fastened on two side plate components 33, 34 via connecting means 43. The components 33, 34 are wholly identical in construction to those of the deflector module 3, so that they may be utilized for assembly of any module. They are connected by corresponding transverse struts 35, 36 extending parallel to the table plates 29. These struts 35, 36 are of identical and interchangeable construction. Four lower adjustable supports 44 which are joined to the components 33, 34 in a vertically displaceable manner via screw-threads are mounted at the lower end of the side components facing away from the table plate module. These four supports 44 allow for displacement for setting the position of the table plate. Bores 42 are situated in the side components, for example, adjacent to a central recess 42' for connecting adjacently arranged modules 2 and 3. As apparent, the transverse struts 35 are joined to the side components 33, 34 below the recess. In the area of the lower transverse struts 36, openings are formed in the side components through which supply conductors and the like may be passed between adjacently arranged and interconnected modules.

As also shown diagrammatically, a guiding track module 7 formed by guiding bars 15 and several feed modules 17 are situated on the upper side of the table plate. A recess 45 accommodating coding module 49 is situated between one of the guiding bars 15 and a front edge 47.

As shown diagrammatically, guiding grooves 51 extending in the table plate in a constant pattern longitudinally and transversely of the guiding bars 15 may be formed in the track plate between the guiding bar 15 distal from the front edge 47 and a rear edge 50 or 25. These guiding grooves 51 may have any optional cross section, for example of C-shape or dovetailed or the like, to facilitate installing handling or machining or technical devices, such as screw-cutting means, rocking or rivetting mechanisms, pressing, punching or like means, on the table plate module 5 and to allow assembling in a stable and positionally precise manner.

Rear conveying module 2 shows that the table plate modules 5 are equipped with an array of bores for reception of the guiding bars 15 and of the feed module 17. Bores 52 arranged behind one another in two rectilinear rows serve the purpose of fastening the guiding bars 15. Bores 53 may be utilized to receive the feed modules 17 and the smaller bores 54 for their attachment. Complementarily, bores 55 for installing or supporting feed mechanisms for parts to be assembled or the like may furthermore be arranged in a row or, if appropriate, in mutually staggered relation in the region of the front edge 47 of the table plate. It is shown, moreover, that, instead of the guiding grooves 51, the table plate may have bores 55 arranged in a grid to allow for positioning and securing auxiliary means such as handling mechanisms, technical means or the like, on the module 2.

The table plate module 5 may be utilized ambilaterally and need merely be pivoted around a central axis 57 centrally arranged with respect to the edge 18 for this purpose. The surface 58 of the table plate module 5 forming the underside on one occasion becomes the upper side upon doing so, whereas the surface forming the upper side 59 then becomes the underside. Since both surfaces 58, 59 are equipped with an identical drilling pattern and with depressions or declivities for the coupling devices or coupling means which should not protrude beyond the surfaces 58 and 59 respectively, an optional utilization of the table plate module 5 is possible at any time without any additional operations. A wider application and economical production of such machine tables is accomplished thereby, so that more versatile tables may be produced in greater numbers and series.

Figure 6:
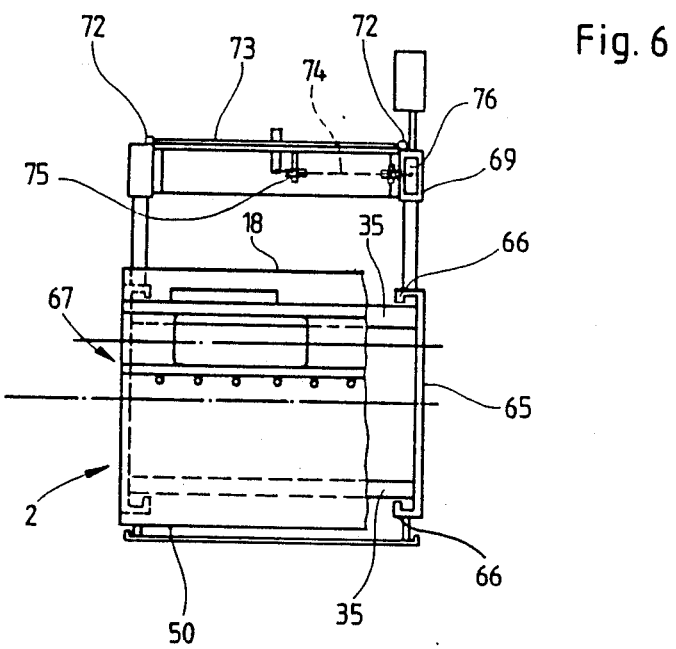
FIG. 6 is a plan view of the conveying module of FIG. 4.

In FIGS. 4 to 7, the conveying module 2 is shown with an accident prevention or safety module 60, an installation module 61 and a verification or monitoring module 62, the advantages of which will now be described. Rear edge 29 and edges 63, 64 extend flush with webs 65 and flanges 66 of the side components 67 which are constructed with a channel-shaped cross section as seen in FIG. 6. This assures that conveying modules 2 arranged one behind another may be placed in direct contact, as shown in FIG. 1, and that the installation module 61 may be mounted in an uncomplicated manner. As already described in relation to FIG. 3, the guiding bars 15 of the guiding track modules 7 are situated on the table plate. The feed modules 17 are connected by a chain to a rotary drive installed on the underside of the table plate and are jointly driven by the rotary drive. Vertical columns 69 formed by hollow sections are spaced from the front edge 18 of the table plate and are supported by means of brackets or cantilevers 68. Thanks to the uncomplicated connection of the columns 69 of the safety module 60 by cantilevers 68, it is possible to make allowance for the prevailing requirements, such as the movement of handling means for extraction of parts from feed mechanisms, and also to accommodate and limit the range of displacement of such devices by means of the safety module.

Figure 7:
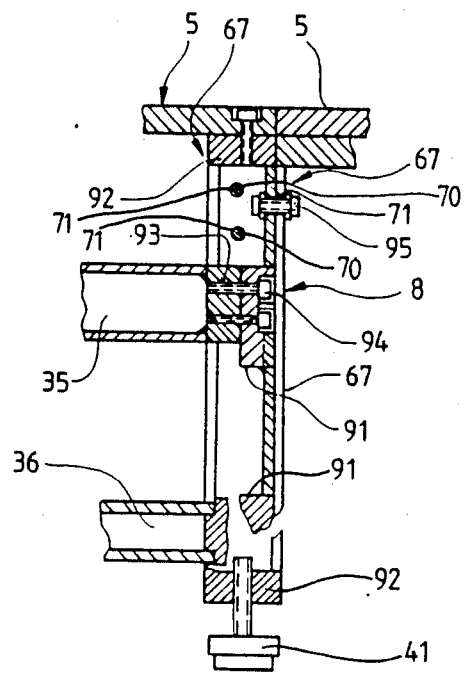
FIG. 7 is a cross-section along line VII—VII of FIG. 4 showing the joints between the plate-like structural element of the table plate and transverse struts.

As more clearly apparent from FIG. 5, the cantilevers 68 formed by hollow sections have their ends equipped with reinforcements into Which are screwed releasable coupling elements 70 through the bores 71 provided in the flanges 66 for this purpose (see FIG. 7). The connection between the cantilevers 68 and the columns 69 is similarly established by means of releasable coupling elements, so that these parts may be disassembled for transport or storing. Longitudinal guiding bars 72 are situated on the side of the columns 69 facing away from the conveying module 2. A protective safety cover plate 73 advantageously produced from a transparent synthetic resin material, for example "plexiglas", is displaceably arranged in these longitudinal guiding bars 72. This displaceable protective safety plate 73 is connected by cable 74 to counterweights 76 which are situated inside the hollow sections of the columns 69. The weight of the protective safety plate 73 is a little greater than the weight of the counterweights 76 running within the columns 69 so that the protective safety plate always tends to assume the closed position. In this closed position, the bottom edge 77 of the safety plate operates a limit switch 78 which is connected to control elements situated in the verification or monitoring module 62 in a manner such that all displacements within the conveying module 2 are stopped by means of an emergency stop safety circuit when the protective safety plate is lifted out of its closed position. Detent means, such as pawls or the like, are arranged for mechanical or pressure fluid actuation releasably to secure the protective safety plate in a raised position.

A continuous installation duct 79 wherein the control lines and hoses connecting the verification or monitoring modules 62 of the individual conveying modules may be arranged is advantageously disposed on the upper side of the columns 69. With appropriate utilization of hollow sections for securing the verification or monitoring modules 62 on the columns 69, the cables or conductors may be led through the cavities of these sections as far as terminal blocks in the verification or monitoring module.

In their end portions facing towards the installation duct 79, the columns 69 are connected to a rear side plate 81 of the installation module 61 by transverse beams 80. This rear side plate has its end portion facing away from the transverse beams 80 bolted to the flanges 66 of the components 67. As more clearly apparent from FIG. 5, the rear side plate 81 may be equipped with bores 82 situated in a grid for reception of control and monitoring elements 83, e.g. of a compressed air service unit, as shown diagrammatically. Even if the bores 82 of the grid of holes do not match the fastening bores of the control and monitoring elements, it is possible in a simple manner to secure these on the rear side plate 81 by means of standardized and prefabricated mounting plates 84. As also denoted in FIG. 4, it is possible to secure additional plates analogous to the rear side plate 81 on the transverse bores 80. The fastening of the transverse beams 80 or rather their connection to the rear side plate 81 or to the columns 69 is likewise obtained by means of releasable connecting means with interpositioning of reinforcing plates, similar to the fastening of the cantilevers 68 or of the transverse struts 35, 36. The part of the conveying module extending downwards from the bottom edge 77 of the protective safety plate 73 is covered by further safety plates 86, 87. To this end, the plates 86 are secured on brackets 89 by means of quick-release connectors 88, e.g. catch-bolts or the like. The bottom plates 87 are suspended in V-shaped grooves open towards the bottom edge 77 and are screwed tight in the area of the slots 90 provided in the flanges 66. An accessibility to the conveying modules and coping in an optimum manner with the needs prevailing in a production plant is assured with maximum reliability by this division of the protective safety plate 73 in the upper displaceable safety plate and the lower safety plate 87. In the upper portions, in which most failures occur, for example in the case of handling or feed mechanisms, rapid access is assured by the weight-relieved protective safety plate 73, and also accessibility is rapidly provided to a large extent even in the area of the workpiece carriers by means of the safety plate 76 and the quick-release connectors 88.

As is apparent from the drawings, the conveying modules 2 in accordance with the invention and having the form of a reinforced housing are not alone in being equipped with plate-like carrying or structural elements, but the same inventive advantages are also exploited for the installation or safety module, whereby a rigid construction is obtained which is of a light-weight form of construction comprising but few components.

The connection of machine tables of two conveying modules 2 as well as the connection of the transverse struts 35, 36 to the structural components 67 and the supporting members 91 situated on these, as well as the anchoring of the table plate 29 on the components 67 via anchoring plates 92, are apparent from FIG. 7. The bores for reception of the coupling devices 37 between the components 67 and the transverse struts 35, 36 are suitably produced after the support members 91 are welded on. The anchoring elements welded to the ends of the hollow sections forming the transverse struts are equipped with internal screw-threads 93 aligned with the bores in the support member 91. A massive node is formed by bolting the components 67 to the transverse struts 35 by means of recessed head bolts 94, and a reinforcement of these principal carrying members of the machine table 67 is primarily secured by the incorporation of two support members 91 extending parallel in the upper and lower areas of the components 67. At the same time, it is assured that adjacently situated side components 67 may be placed in areal contact and joined without gaps by recessing the heads of bolts 94. To couple these side components, through-bolts 95 are inserted in the bore 71 and tightened to a predetermined torque after adjusting the directly adjacently situated side components. This assures a stepless transition between the table plates of adjacently situated modules. The same also applies regarding the guiding bars of the guiding track modules which are then installed on the table plates.

A satisfactory stability is assured by the safe anchoring of the supports 41 in the anchoring plates 92 thanks to the reinforcement of the ends opposed to the table plate in the transition between the web 65 and the flanges 66 of the components 67 since the guided or located length of the supports 41 equipped with a screw-threaded rod is determined by the thickness of the anchoring plates 92 and the length of the screw-thread provided in these, and may be adapted easily to different load conditions.

What is claimed is:

1. A [safety module for a ] machine table having two vertically extending support elements and a table plate supported on, and connected to, the support elements, each support element having flanges defining bores, [the ] in combination with a safety module comprising
   (a) two hollow vertical columns having longitudinally extending guide tracks,
   (b) safety plate means supported by the vertical columns for protecting the machine table and designed to aid in the prevention of accidents, the safety plate means comprising a transparent safety plate having a bottom edge and the guide tracks receiving the safety plate for displacement therealong,
   (c) cantilevers connecting the columns to the flanges at a front of the machine table, [and]
   (d) releasable coupling devices received in the bores for connecting the cantilevers thereto[.],
   (e) two pulling cables having one end attached to the safety plate,
   (f) counterweights attached to ends of the cables opposite to the one cable ends and pulleys between the cable ends over which the cables are trained, the counterweights being arranged inside the hollow columns, and
   (g) limit switches arranged in the displacement path of the safety plate for engagement therewith when the safety plate is in its lowermost position.

2. The machine table of claim 1, the vertical columns of the safety module having upper ends situated above the table plate and the cantilevers of the safety module connecting lower ends of the columns to the front flanges, the combination further comprising a vertical rear plate having a lower end connected to the flanges at a rear of the machine table and having an upper end situated above the table plate, and transverse beams interconnecting the upper ends of the vertical columns to the upper end of the rear plate.

3. The machine table of claim 1, the safety plate means comprising additional safety plates arranged in a gap between the bottom edge of the transparent safety plate and transverse struts extending in one of the horizontal planes near lower ends of the support elements, and quick-release fasteners for securing the additional safety plates.

* * * * *